April 18, 1933. M. PIER ET AL 1,904,521
SEPARATION OF OILS FROM SOLID RESIDUES
Filed Sept. 15, 1928
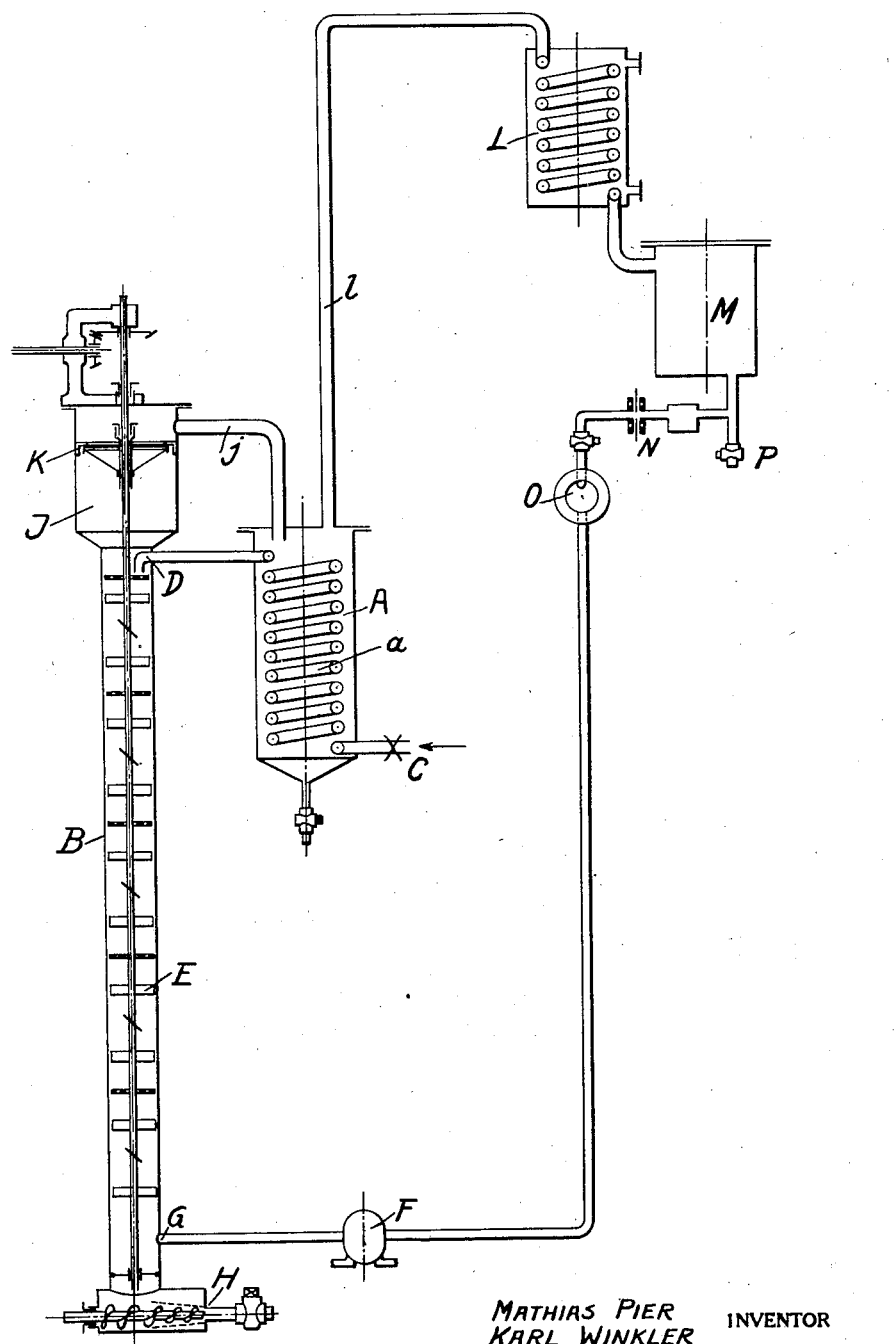
MATHIAS PIER
KARL WINKLER
INVENTOR
BY *Hauff Warland*
ATTORNEYS.

Patented Apr. 18, 1933

1,904,521

UNITED STATES PATENT OFFICE

MATHIAS PIER, OF HEIDELBERG, AND KARL WINKLER, OF LUDWIGSHAFEN-ON-THE-RHINE, GERMANY, ASSIGNORS, BY MESNE ASSIGNMENTS, TO STANDARD-I. G. COMPANY, OF LINDEN, NEW JERSEY, A CORPORATION OF DELAWARE

SEPARATION OF OILS FROM SOLID RESIDUES

Application filed September 15, 1928, Serial No. 306,277, and in Germany October 27, 1927.

This invention relates to improvements in and apparatus for the separation of oils obtained in the destructive hydrogenation of carbonaceous materials such as varieties of coal, tars, mineral oils and the like from solid residues.

It has been proposed to separate oils, bitumens, asphaltums and the like from solid substances containing the same and which are insoluble in said oils, bitumens or asphalts, such as varieties of coal, shale and the like by the aid of extraction agents such as benzene, for example from the oily products, such as residues and the like, obtained by the destructive hydrogenation of varieties of coal, tars, mineral oils and the like. The methods of working hitherto practised however and mostly adapted for working only on a small scale, are very cumbrous and expensive, and they are also inadequate as regards heat economy. The treatment of very large quantities of the said residues such as are obtained by the destructive hydrogenation of carbonaceous materials such as varieties of coal and the like on a manufacturing scale, is often imperfect, when carried out by the usual and already known methods, with the employment of filters, suction filters, centrifuges and the like.

We have now found that the separation of the said oils obtained by destructive hydrogenation, from the solid substances insoluble in said oils can be effected in a highly advantageous manner, by extraction with solvents, without recourse to filtration by suction, expensive filtration, centrifuging and the like, and with extensive utilization of heat, if the solvent, which is recovered and used over again, and the mixture to be separated, which are preferably brought into mutual contact on the counterflow principle, be continuously introduced and removed, the extraction residue and product being also continuously drawn off from the vessel in which the treatment takes place.

A great variety of extraction agents may be employed according to this method of working, including agents already known, such as benzene or carbon disulphid and the like. Mixtures of various solvents may also be employed as the extraction agents, and substances which cause the rapid deposition of the floating solid constituents, for example, readily volatile substances of quite a different nature, such as methanol, acetone, carbon tetrachlorid and the like may be added to the solvents. Such of the liquid destructive hydrogenation products as boil below 300° C. may suitably be employed for the extraction. In the extraction of residues obtained by the destructive hydrogenation of brown coal, use is made, for example, of middle oils recovered in the said destructive hydrogenation process itself. It may be of advantage, especially when dealing with residues rich in asphaltic substances, to employ extraction agents having a high content of aromatic compounds. Inasmuch as only small amounts of the extracting agents are to be made up according to the present process, a small plant can be operated, under such conditions, in conjunction with a plant for the destructive hydrogenation of brown coal, that an oil chiefly containing aromatic constituents is formed, for example by treating ordinary coal or a mixture of coal and brown coal, which oil is employed to extract the residues produced in the whole plant. In the case of a destructive hydrogenation plant in which coal is treated, oils with a low content of aromatic constituents, such as the destructive hydrogenation products from coal, with boiling points up to about 300° C., may be employed directly for the extraction.

It may also be convenient to employ different solvents in succession, in which case either the extracted residues are passed into a second apparatus containing another solvent in circulation, or else a different solvent is passed through the same apparatus, after a certain interval and through the already treated products. In this way it is possible to isolate products which differ in character.

The products to be separated may also be mixed with the extraction agent prior to being introduced into the extraction apparatus. In certain circumstances it is, however, also advantageous first to employ a method of separation other than extraction, such as mechanical treatment or incomplete low temperature distillation, prior to the extraction.

The extraction treatment may also be carried out in such a way as to leave small quantities of oil still in the residues. These latter can then be treated in an economical manner, in a suitable producer, for the production of oil gas and, in particular a gas containing unsaturated hydrocarbons such as ethylene and the like. This course has the advantage of preventing the residue from caking and encrusting on the walls, and consequently enables it to be removed from the apparatus in a continuous manner.

The extraction can also be effected under pressure. For example, the hot sludge leaving the destructive hydrogenation plant can be introduced into the solvent in an extraction chamber which is under pressure, and the oil freed residues can be allowed to drop into a liquid, such as water, situated in the lower part of the dissolving tower and exposed to the working pressure, thus effecting a complete separation of the volatile carbonaceous products and especially of the solvent, whereupon the residues are discharged from the reaction vessel in a simple manner, as for example by passing them through a lock or the like. The liquids into which the oil freed residues are allowed to drop must have a surface tension lower than that of the volatile carbonaceous products to be separated from the residues. Substances lowering on the surface tension may be added to the liquid.

The method of discharging by the agency of a liquid may also be employed when working under ordinary pressure.

Apparatus suitable for carrying out the process according to this invention will now be described with reference to the accompanying diagrammatic drawing, benzene being used in this example as the extraction agent.

The hot sludge leaving the high-pressure vessel is discharged, through a valve C into the extraction apparatus being first passed through a coil $a$ in an evaporator A, for heat exchange purposes, after which it enters the upper end of an extraction chamber B at D, where it is distributed over the entire cross-sectional area of the chamber, by means of a distributing device, and travels slowly downwards being kept in continuous rotary motion by stirrers E. Benzene is forced into the lower end of the extraction chamber at G, by means of a pump F, and flows in the opposite direction to the sludge, thereby dissolving out the oil, while the solid residues sink gradually down and are discharged at H by means of a worm, the temperature in the working chamber being about 45 to 55 degrees centigrade.

The traces of solvent still adhering to the residues are removed in an adjacent apparatus, preferably by means of hot scavenging gases, and recovered.

The solvent, laden with oil, passes up into a wider settling vessel J, where, in consequence of the altered cross sectional area and the resulting considerable drop in the velocity of flow, the fine particles of coal and ash constituents hitherto in suspension, are deposited. When the apparatus is working under a heavy load, it may also be advisable to introduce a suitable filter K, which is kept freed from solid matter by means of a scraper integrally connected with the stirrer mechanism.

The mixture of benzene and oil, which has been freed from solid residues in the above manner, passes by the pipe $j$ into the evaporator A, which is maintained at from 140° to 160° C. The evaporated benzene passes through the pipe 1 to the condenser L where it is condensed and flows into the collector M from which it returns, through the meter N and inspection chamber O, to the circulation pump F. When necessary, the supply of benzene can be replenished through the cock P.

The operation can be conducted, in a similar manner, with other solvents or mixtures of the same.

The temperature of the extraction tower and evaporator depends on the solvents used in each case, and on the purposes for which the recovered oil is intended. For instance it is sometimes advisable and economical, especially when it is intended to produce engine fuels, not to expel the final traces of benzene, since, as is well known, these improve the motive power properties of the benzene to be recovered.

The following example will further illustrate the nature of the said invention, which, however, is not limited thereto.

*Example*

A charge, consisting of the sludge resulting from the destructive hydrogenation of coal and containing from 30 to 35 per cent of solids, is introduced into the above apparatus at the rate of 200 kilograms per hour, and which on extraction furnishes about 65 kilograms of residues, which are completely free from oil and may still contain from 5 to 15 per cent of benzene, which is expelled, by steam distillation, in an apparatus not shown in the drawing. For such a charge, from 300 to 400 liters of benzene are pumped through the apparatus per hour. With an evaporator temperature of 140° C., a heavy oil is obtained still containing from about 1 to 3 per cent of benzene. The remainder of the benzene is condensed and returned to the collector M. From about 135 to 140 kilograms of heavy oil are obtained, which may for example either be subjected to destructive hydrogenation or employed for triturating coal intended for treatment by hydrogenation under pressure.

What we claim is:

1. An apparatus for continuously separating oils from solid residues, comprising a tall cylindrical extraction vessel fitted with means for imparting a continuous rotary movement to the material under treatment, means for introducing the solvent into the said vessel and for passing it in a counter-current to said material, means for continuously removing the extracted residue, an extension at the top of said tall cylindrical vessel in the form of a vertical cylinder of a larger diameter than said extraction vessel, means for continuously removing the extraction product arranged at the top of said extension and a filter arranged in said extension.

2. In the treatment of the entire residue obtained by the destructive hydrogenation of solid carbonaceous materials to separate the oils from the solids insoluble in said oils and contained in said residue, by extraction with an organic solvent containing at least some aromatic constituents, the step of continuously introducing the solvent and the mixture to be separated to and continuously removing the extraction product and the extracted residue from the vessel in which the treatment is carried out.

3. In the treatment of the entire residue obtained by the destructive hydrogenation of solid carbonaceous materials to separate the oils from the solids insoluble in said oils and contained in said residue, by extraction with an organic solvent containing at least some aromatic constituents, which solvent is recovered and used again, the step of continuously introducing the solvent and the mixture to be separated to and continuously removing the extraction product and the extracted residue from the vessel in which the treatment is carried out.

4. In the treatment of the entire residue obtained by the destructive hydrogenation of solid carbonaceous materials to separate the oils from the solids insoluble in said oils and contained in said residue, by extraction with an organic solvent containing at least some aromatic constituents, which solvent is recovered and used again, the step of continuously introducing the solvent and the mixture to be separated to and continuously removing the extraction product and the extracted residue from the vessel in which the treatment is carried out, the solvent and the mixture under treatment being passed in a counter-current to one another.

5. In the treatment of the entire residue obtained by the destructive hydrogenation of solid carbonaceous materials to separate the oils from the solids insoluble in said oils and contained in said residue, by extraction with an organic solvent having a high content of aromatic hydrocarbons, the step of continuously introducing the solvent and the mixture to be separated to and continuously removing the extraction product and the extracted residue from the vessel in which the treatment is carried out.

6. In the treatment of the entire residue obtained by the destructive hydrogenation of solid carbonaceous materials to separate the oils from the solids insoluble in said oils and contained in said residue, by extraction with an organic solvent containing at least some aromatic constituents, the step of continuously introducing the solvent and the mixture to be separated to and continuously removing the extraction product and the extracted residue from the vessel in which the treatment is carried out and allowing the extracted residue to drop into a liquid, exposed to the working pressure, and having a surface tension such that complete separation of the volatile carbonaceous products, especially the solvent, is effected, whereupon the residues are discharged from the reaction vessel.

7. In the treatment of the entire residue obtained by the destructive hydrogenation of solid carbonaceous materials to separate the oils from the solids insoluble in said oils and contained in said residue, by extraction with benzene which is recovered and used again, the step of continuously introducing the benzene and the mixture to be separated to and continuously removing the extraction product and the extracted residue from the vessel in which the treatment is carried out.

8. The process for the separation of oils from solids insoluble in the said oils and contained in the residue obtained by the destructive hydrogenation of solid carbonaceous materials which comprises continuously passing the residue in a counter-current to benzene, as a solvent, at a temperature of about 45 to 55° C., the solvent and the extracted residue being continuously discharged and the initial residue and the benzene continuously introduced.

9. The process of treating the entire residue obtained by the destructive hydrogenation of solid carbonaceous materials to separate the oils from the solids insoluble in said oils and contained in said residue, by extraction, which comprises continuously introducing an organic solvent containing at least some aromatic constituents and the mixture to be separated to and continuously removing the extraction product and the extracted residue from the vessel in which the extraction is carried out and then submitting the extracted residue to a further treatment with a different solvent selected from the class consisting of products from the destructive hydrogenation of distillable carbonaceous materials, benzene and carbon disulphide.

In testimony whereof we have hereunto set our hands.

MATHIAS PIER.
KARL WINKLER.